United States Patent [19]

Bhatia

[11] 4,145,509

[45] Mar. 20, 1979

[54] POLYACRYLATED POLYURETHANES AND GASKETS HAVING SEALANTS THEREOF

[75] Inventor: Yog R. Bhatia, Glen Ellyn, Ill.

[73] Assignee: Dana Corporation, Toledo, Ohio

[21] Appl. No.: 898,921

[22] Filed: Apr. 21, 1978

[51] Int. Cl.$^2$ ............ C08G 18/16; C08G 18/62; F16J 15/14; B65D 53/06

[52] U.S. Cl. .................. 528/50; 260/37 M; 260/37 N; 260/859 R; 428/425; 528/75; 277/166; 277/DIG. 6

[58] Field of Search ............ 260/859 R, 77.5 CR; 428/425; 528/75, 50; 277/138–166

[56] References Cited

U.S. PATENT DOCUMENTS

| | | | |
|---|---|---|---|
| 2,029,302 | 2/1936 | Balfe | 288/1 |
| 2,071,322 | 2/1937 | Balfe | 288/1 |
| 2,992,939 | 7/1961 | Larson et al. | 117/75 |
| 3,030,249 | 4/1962 | Schollenberger et al. | 154/43 |
| 3,193,438 | 7/1965 | Schafer | 161/89 |
| 3,291,859 | 12/1966 | Tobolsky | 260/859 R |
| 3,524,794 | 8/1970 | Jonnes et al. | 161/160 |
| 3,549,407 | 12/1970 | Williamson | 117/45 |
| 3,645,977 | 2/1972 | Wolelgemuth et al. | 260/77.5 |
| 3,695,918 | 10/1972 | Ward | 117/47 A |
| 3,700,643 | 10/1972 | Smith et al. | 260/77.5 AN |
| 3,862,920 | 1/1975 | Foster et al. | 260/77.5 MA |
| 4,057,431 | 11/1977 | Finelli et al. | 260/859 R |

*Primary Examiner*—H.S. Cockeram
*Attorney, Agent, or Firm*—Wilson, Fraser & Clemens

[57] ABSTRACT

An improved gasket is disclosed having a novel sealant comprising the reaction product of a monoacrylated, terminated, active hydrogen-containing hydrocarboxy reactant an aromatic diisocyanate, and a polyacrylated terminated hydrocarboxy reactant. The active hydrogen of the monoacrylated reactant reacts with at least one isocyanate radical of the aromatic diisocyanate to form an isocyanate linkage, and the reaction product of the monoacrylated and diisocyanate reactant is further reacted with the polyacrylated terminated reactant in widely varying mole ratios. The resulting gaskets have improved temperature resistance, compressibility, film hardness, elongation, flexibility, and organic solvent resistance.

19 Claims, No Drawings

POLYACRYLATED POLYURETHANES AND GASKETS HAVING SEALANTS THEREOF

BACKGROUND OF THE INVENTION

Gaskets are often used to provide a fluid-type seal between two engaging, confronting, or mating parts. A common example includes pipes of similar conduit having machined flanges which are butted together about a gasket, the gasket having a large central opening matching that of the interior of the pipes as well as much smaller peripheral holes registering with like holes in the flanges jointly to receive bolts or the like to secure the assembly together.

In general, gasket materials comprise a base sheet of uniform thickness which may be of sheet metal or of fibrous composition held together by a suitable bonding agent. A deformable, elastomeric coat or bead covers all or only selected areas of the base sheet. In use the coat or bead deforms or spreads under pressure of forcing together the parts between which the gasket material lies and thereby the coat or bead aids in realizing a desired fluid-type seal between the parts.

At present, gaskets which function at 300° F. or higher are manufactured from two to five ply laminates consisting of one or two metal sheets and one to three asbestos sheets. These laminated constructions are expensive to manufacture because they require excessive labor and material. Also the use of asbestos has become increasingly regarded as toxic and unsafe to handle.

Polyacrylate-polyurethane copolymers are generally known in the art. U.S. Pat. No. 3,695,918 to Ward discloses using a polyurethane resin as an intermediate adhesive coat between a thermoplastic film and a coating of a heat sealable material. It is disclosed that the coating may be modified by blending with other materials such as acrylic resin.

U.S. Pat. No. 3,645,977 to Wolgemuth et al teaches a polyurethaneacrylate in combination with other materials. This patent discloses heat-curable terpolymers comprising the residue of an acrylate, an acrylate acid and N-vinyl urethanes.

U.S. Pat. No. 3,549,407 to Williamson discloses a coating material for a metal substrate which comprises a base composition of a urethane polymer and a vinyl chloride. A webbing composition is applied over the base composition consisting of a methacrylate polymer.

U.S. Pat. No. 3,193,438 to Schafer discloses foaming a polyurethane resin and impregnating the foam with polymerizable monomers containing ethylenic unsaturation, such as acrylate and methacrylate esters.

U.S. Pat. No. 3,030,249 to Schollenberger et al teaches the use of articles that are coated with polyurethanes having other structures bonded thereto by means of a primer layer comprising a partial ester of a linear polyacrylic acid anhydride.

SUMMARY OF THE INVENTION

The principal object of the invention is to provide a novel class of polyacrylate-polyurethane copolymers, and a closely related object is to provide improved gasket material having such polyacrylatepolyurethane copolymers as a sealant.

In general, the present polyacrylate-polyurethane copolymers are prepared by reacting (a) a monoacrylated terminated active hydrogen-containing hydrocarboxy reactant, (b) an aromatic diisocyanate, and (c) a polyacrylated terminated hydrocarboxy reactant, in which the active hydrogen of reactant (a) reacts with at least one isocyanate radical of reactant (b) to form an isocyanate linkage, and the reaction product of reactants (a) and (b) reacts with reactant (c) in a molar ratio, respectively, of from 1:25 to 25:1.

While it is preferable for an active hydrogen of reactant (a) to react with both isocyanate radicals of reactant (b), it is contemplated that the active hydrogen of reactant (a) may react with only one such isocyanate radical, the other isocyanate radical undergoing other reaction, such as with the carboxyl radical of an organic acid to form an ester group.

Preferred reactants are a monoacrylated, lower alkylene glycol for reactant (a), phenylene diisocyanate or toluylene diisocyanate for reactant (b), and a diacrylated alkylene glycol for reactant (c).

The gaskets are prepared by applying a solvent-free reaction mix of the indicated reactants onto a base sheet of the gasket material and then bringing about the reaction as described to form preferably a cross-linked ultimate product.

The reaction may be initiated by heat alone, although preferably a peroxide catalyst is included in the reaction mixture to catalyze the reaction. Relatively heavy or thick coatings of a sealant on a base sheet can be realized in this process in one step. The resulting gasket has improved properties, particularly as to temperature resistance, compressibility, hardness, elongation, flexibility, and solvent resistance to improve the temperature resistance of the sealant and the gasket, metal powders such as aluminum powder may also be incorporated into the reaction mixture.

DESCRIPTION OF THE PREFERRED EMBODIMENTS

In resume, the present composition of matter is a reaction product of (a) a monoacrylated terminated, active hydrogen-containing hydrocarboxy reactant, (b) an aromatic diisocyanate, and (c) a polyacrylated terminated hydrocarboxy reactant, the active hydrogen of reactant (a) reacting with at least one isocyanate radical of reactant (b) to form an isocyanate linkage, the reaction product of the reactants (a) and (b) being reacted with reactant (c) in a molar ratio, respectively, of from 1:25 to 25:1. Each of the various reactants is described in turn, then the manner of reacting them, and, finally, the use of the end reaction product as a sealant on a base sheet to form a gasket material. Improved properties of the present gasket materials are also described.

Monoacrylated Terminated Reactant (a):

Considering initially the monoacrylated terminated, active hydrogen-containing hydrocarboxy reactant, as used here and in the claims, the term "hydrocarboxy" is intended to mean a substantially linear organic compound containing hydrogen, carbon, and oxygen atoms and further containing reactive sites which, in the case of reactant (a), includes one terminal acrylate radical and one active hydrogen. Normally, the basic stem of reactant (a) is alkylene. The active hydrogen atom is one giving a positive Zerewitinoff test and is, therefore, reactive with an isocyanate radical of reactant (b). The active hydrogen atom can be found in a number of different groups, such as an amino group, but preferably present as a hydroxy group. Thus, examples of reactant (a) may have the following formula:

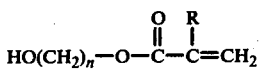

in which R is hydrogen or methyl, and n is a whole number from 1 to 8.

The following is not intended to be an exhaustive list but illustrates some of the reactants that may be used for reactant (a):

2-Hydroxyethyl methacrylate Hydroxypropyl methacrylate
2-Hydroxyethyl acrylate Hydroxypropyl acrylate
2-Aminoethyl methacrylate
2-Aminoacrylate Reactant (a) has basically an alkyl or alkylene linear stem which may have a molecular weight up to about 8,000 excluding the acrylate moiety. A preferred reactant (a) is monoacrylated ethylene glycol.

Aromatic Diisocyanate Reactant (b):

Useful aromatic diisocyanates may range from a simple single aromatic ring to a more complex diisocyanate arrangement containing 2, 3, 4 and even more aromatic diisocyanate rings ultimately joined together. The aromatic diisocyanate radical can be unsubstituted, as in phenylene, or methyl substituted, as in toluylene. Examples of diisocyanate moieties that may be present in the ultimately reacted product under the present invention include the following

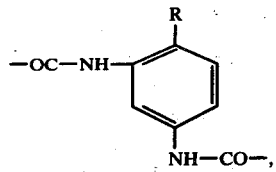

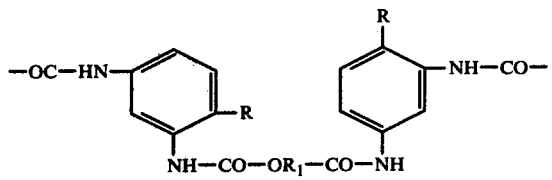

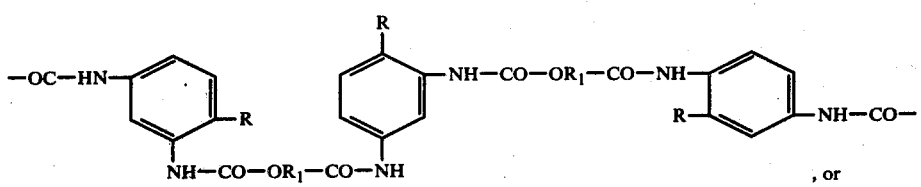

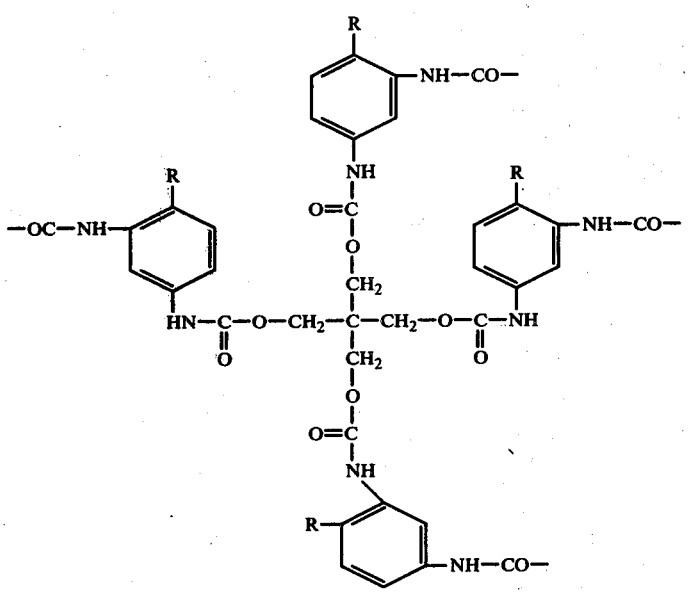

in which R is hydrogen or methyl, and $R_1$ is $(C_2H_4O)$ n, and n is a whole number from 1 to 8. A preferred aromatic diisocyanate is tolylene diisocyanate.

Polyacrylated Terminated Reactant (c):

Reactant (c) is a polyacrylated terminated hydrocarboxy reactant in which here and in the claims the term "hydrocarboxy" is intended to mean a substantially linear organic compound containing hydrogen, carbon, and oxygen atoms and further containing reactive sites which in the case of reactant (a) includes at least two terminal acrylate radicals. The desired polyacrylated terminated reactants are diacrylated alkylene glycols, such as an alkylene glycol diacrylate, alkylene glycol dimethacrylate, a polyalkylene glycol diacrylate, and a polyalkylene glycol dimethyacrylate, in which the alkylene group contains four to eight carbon atoms. The preferred diacrylated terminated reactant is diacrylated tetraethylene glycol.

Among the diacrylated terminated hydrocarboxy reactants which may be used are:

Ethylene glycol dimethacrylate
Diethylene glycol diacrylate
Diethylene glyco dimethacrylate
Triethylene glycol dimethacrylate
Tetraethylene glycol diacrylate
Polyethylene glycol diacrylate (having an average molecular weight of about 200)
1,3 Butylene glycol diacrylate
Tetraethylene glycol dimethacrylate
Polyethylene glycol dimethacrylate (having an average molecular weight of about 200)
1,4 Butane diol diacrylate
1,6 Hexane diol diacrylate
1,6 Hexane diol dimethacrylate
Ethoxylated bisphenol A dimethacrylate
2,2 dimethylpropane-1,3-diacrylate As indicated, polyacrylated terminated hydrocarboxy reactants having more than two acrylate groups may also be used, such as:

Pentaerythritol triacrylate
Trimethyolpropane trimethacrylate
Trimethylolpropane triacrylate
Pentaerythritol tetramethacrylate
Dipentaerythritol monohydroxypenta acrylate The Reaction:

The monoacrylated terminated reactant reacts with the aromatic diisocyanate in a molar ratio of either 1:1 or preferably 2:1. In the latter instance, each active hydrogen atom of the two moles of the monoacrylated reactant reacts with an isocyanate radical of the aromatic diisocyanate to form isocyanate linkages which may be illustrated for 2-hydroxyethyl acrylate and toluylene diisocyanate as follows:

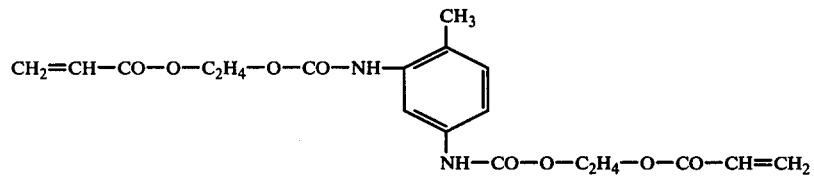

When the monoacrylated terminated reactant and the diisocyanate react in a molar ratio of 1:1, the process can still continue as herein contemplated. In this instance, the monoacrylated terminated reactant reacts with only one diisocyanate radical of the aromatic diisocyanate whose other isocyanate radical can undergo various other reactions. For example, the other isocyanate radical may react with a carboxyl radical of an organic acid to form an ester group. The ester group may have a molecular weight of about 500 to about 6,000. As an instance, the esterified isocyanate radical of an aromatic diisocyanate may have the following formula:

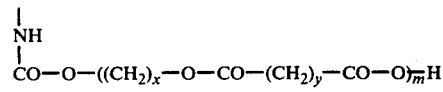

in which x is a whole number from two to four, y is a whole number from 2 to 12, and m is a number sufficient to provide a molecular weight from about 500 to about 6,000 for the esterified isocyanate radical After the initial reaction has taken place between the monoacrylated terminated reactant and the aromatic diisocyanate, the resulting product is reacted with the polyacrylated terminated hydrocarboxy reactant. This reactant serves primarily as a cross-linking agent chemically to band together linear chains formed from the initial reaction. As a result, molar ratios of the reactants at this juncture vary widely, depending on the physical properties sought in the final reaction product. For example, the monoacrylated-diisocyanate reaction product may be interreacted with the polyacrylate terminated reactant in a molar range, respectively, of 1:25 to 25:1.

Interreactions in a molar range of 1:25 to 1:1, respectively, are preferred for products having less flexibility after cure.

Interreactions in a molar range of 1:1 to 25:1, respectively, are preferred for products having good flexibility after cure. A preferred ratio of the initial reaction product to the polyacrylated terminated reactant is 1:1, respectively.

The reaction of a reaction mix containing the three defined reactants may be initiated and carried out by heat alone, heating the reaction mix from about 200° F. to about 400° F. for about five minutes to about sixty minutes. However, alternate means can be employed to bring about the reaction, such as free radical polymerization. For instance, peroxide catalysts can be included in the reaction mixture for this purpose. Such catalysts are well known in the art and include benzoyl peroxide, acetyl peroxide, di-tertiary butyl peroxide, diethyl peroxide, lauroyl peroxide, and the like. The amount of catalysts may range from about 0.1 percent to about 10 percent by weight of the reaction mix. As another alternative, the reaction may be initiated and carried out be exposing the mix to electron beam radiation or ultraviolet radiation.

Gasket Preparation:

In preparing a gasket of the present invention, the described reaction mix is applied to a base sheet of gasket material and the reaction then carried out. The manner of application is not critical. The reaction mix may be applied by roller coating, dipping, doctor knife, brushing, and the like.

If is preferred to apply the reaction mix as such, that is, without the presence of a solvent. In this respect, the present gasket has an advantage over those of the prior art, because the application of a relatively heavy coat is possible in one step due to the solventless nature of its application. As a result no solvent is entrapped in the cured coating.

The base sheet may comprise compositions presently used in the art for that purpose. The sheet may comprise, for example, any one of a number of relatively dense sheet materials having substantially uniform thickness which are deformable so as to conform to the contour of the surfaces over which the sheet is applied. Sheet materials which have been found useful include various fibrous compositions usually containing a fibrous reinforcing or bonding agent. Such fibers may include organic fibers, such as cellulose, or inorganic fibers, such as glass fibers, as well as mixtures of the two. The fibrous network can be bonded into an integral sheet by employing a suitable binding agent which can be naturally occurring resinous substances or various synthetic resins and elastomeric materials, such as natural or synthetic rubbers including polysulfide, acrylonitrile-butadiene, polychloroprene, and the like. Small proportions of metallic fibers can also be included in the base sheet. The base sheet may also comprise such structures as a semi-porous fiber board reinforced with a thermoplastic resin, such as a sheet of mineral fibers bonded with cured nitrile rubber or phenolic resin. Additionally, the base sheet can be metal sheets such as sheets of steel, aluminum, zinc, and the like. The base sheet may range in thickness from about 0.002 inch up to about 0.250 inch and preferably from about 0.005 inch to about 0.065 inch, although sizes outside of these ranges can be used.

When the gasket is intended for high temperature applications, the base sheet is usually metal and metal powder is incorporated into the reaction mix. Comminuted metal powders such as aluminum, iron, zinc, and copper may be used and normally comprises from about one percent to about 40 percent by weight of the reaction mix.

Gaskets prepared as described have improved properties, particularly as to temperature resistance, compressibility, film hardness, elongation, flexibility, and organic solvent resistance. With metal powder in the sealant, the gaskets can withstand temperatures as high as 500° F. for two to four hours and can withstand temperatures up to 425° F. continuously. Even without the addition of metal powders, the present gaskets can withstand temperatures as highly as 300° F. continuously. Table A provides desired and preferred ranges of physical properties which are possible with sealants consisting essentially of the present acrylated polyurethanes on standard gasket based sheets. The coat of the sealant was about 0.005 inch thick. The variance in properties is realized not only by the type of reactants chosen within the classes described but also by varying the molar ratio of reaction between the monoacrylated-diisocyanate and the polyacrylated terminated reactant.

TABLE

|  | Desired Range | Preferred Range |
| --- | --- | --- |
| Compressibility at 1000 psi | 2 - 20% | 5 - 20% |
| Film Hardness by Pencil Test | 6B - 4H | 6B - H |
| Elongation of 0.005 inch thick and 1 inch. wide film | 2 - 100% | 5 - 25% |
| Flexibility by Mandrel Test | ⅛ - 1 inch. mandrel (no failure) | ⅛ - ¼ inch mandrel (no failure) |

The following examples are intended to illustrate the invention and should not be construed to impose limitations on the claims.

EXAMPLE 1

The following composition was prepared by mixing the ingredients with a mechanically driven stirrer:

| Polyacrylated urethane resin | 28 | grams |
| --- | --- | --- |
| 2-Ethylhexyl acrylate | 1 | grams |
| Hydroxypropyl methacrylate | 9 | grams |
| Acrylic acid | 2 | grams |
| Aluminum powder | 8 | grams |
| Dicumyl peroxide | 0.6 | gram |
| Calcium carbonate | 0.9 | gram |
| Ethoxyethoxyethyl acrylate | 2 | grams |
| Tetraethylene glycol dimethacrylate | 5 | grams |

The polyacrylated resin was a polyester based urethane acrylate. It was prepared by reacting butyl adipate polyester with toluylene diisocyanate, and then reacting the resulting reaction product with hydroxy ethyl acrylate. The resin is sold under the trademark, "Uvithane 782" by the Thiokol Corporation of Trenton, New Jersey.

About 0.005 to 0.01 inch thick coatings were applied on both sides of phosphated 0.025 inch thick steel sheets with a brush, and baked for 10 minutes at 400° F. to form a gasket. The coatings had good flexibility and ahesion and did not fail when bent around a 0.25 inch mandrel. Also, the coating did not chip off when heat aged for 2000 hours at 425° F. and then for an additional five hours at 500° F.

A nitrogen sealability test carried out on a specimen having a 0.01 inch bead sealed nitrogen gas at a pressure of 60 p.s.i. This is better than a conventional gasket specimen which has a sealant layer composed of 0.045 inch thick laminate of two perforated steel sheets and an asbestos sheet. Also, the specimen coated with the polyacrylated polyurethane coating prepared in this example sealed nitrogen gas at 60 p.s.i. completely with no leakage under a load on the gasket of only 3,850 pounds. But, the conventional gasket specimen did not seal nitrogen completely even when a load of upto 20,000 pounds was applied.

EXAMPLE 2

|  | Composition 1 | | Composition 2 | |
| --- | --- | --- | --- | --- |
| Polyacrylated urethane resin | 20 | grams | 20 | grams |
| Tetraethylene glycol dimethacrylate | 2 | grams | 2 | grams |
| Aluminum powder paste (66% solids in xylene) | 12 | grams | 6 | grams |
| Dicumyl peroxide | 0.8 | grams | 0.8 | grams |
| Calcium carbonate | 1.2 | grams | 1.2 | grams |

These compositions were prepared by mixing the ingredients with a mechanically driven stirrer. The polyacrylated resin was the same as in Example 1. About 0.005 to 0.010 inch thick coatings were applied on phosphated 0.025 inch thick steel sheets with a doctor blade to form gaskets. For both compositions the coatings were cured for 10 minutes at 400° F. Those coatings had good flexibility and adhesion and did not fail when bent around a 0.25 inch mandrel. Also, the coated steel sheets were heat aged for 2000 hours at 425° F. and for an additional five hours at 500° F. but the coating did not chip or flake. Strips of the gaskets were immersed in a 50:50 mixture of boiling water and ethanol for 70 hours. Upon examination, the strips were found to be affected only slightly. Also, the strips of the cured coatings were immersed in toluene for 24 hours at about 60° F. to 80° F. for 24 hours and were substantially unaffected.

EXAMPLE 3

|  | Composition 1 | Composition 2 |
|---|---|---|
| Polyacrylated urethane resin | 20 grams | 20 grams |
| Tetraethylene glycol dimethacrylate | 2 grams | 2 grams |
| Aluminum powder paste (66% solids in xylene) | — | 12 grams |
| Ethoxyethoxyethyl acrylate | 4 grams | 4 grams |

These compositions were prepared by mixing the ingredients with a mechanically driven stirrer. The polyacrylated resin was the same as in Example 1. About 0.003 to 0.01 inch thick films were applied with a doctor blade on phosphated steel sheets having a thickness of 0.025 inch. The films were cured by exposure to an electron beam of 10 to 20 megarads under a nitrogen blanket.

To illustrate the effect of the addition of aluminum powder, the cured films of Compositions 2 did not chip off after heat aging at 425° F. for 2000 hours. Also, these coatings did not fail when bent around a 0.25 inch mandrel. The cured films of Composition 1, which did not contain any metal powder, also passed the same mandrel test after being heated at 300° F. for 2000 hours, but failed the mandrel test after being heated at 425° F. for 2000 hours.

EXAMPLE 4

|  | Composition 1 | Composition 2 |
|---|---|---|
| Polyacrylated urethane resin | 20 grams | 20 grams |
| Tetraethylene glycol dimethacrylate | 30 grams | 10 grams |
| Aluminum powder paste (66% solids in xylene) | 24 grams | 12 grams |
| 2,5-Dimethyl-2,5-di(t-butylperoxy) hexane | 1 gram | — |

These compositions were prepared by mixing the ingredients with a mechanically driven stirrer. The polyacrylated resin was the same as in Example 1. About 0.005 to 0.010 inch thick coatings of these compositions were applied with a doctor blade on 0.025 inch thick phosphated steel sheets. The coatings were cured for 10 minutes at 400° F. The coatings did not chip off after heat aging for 1000 hours at 425° F. A strip of the coating and steel sheet did not dissolve when immersed in toluene for two weeks at 60° to 80° F.

Although the foregoing describes several embodiments of the present invention, it is understood that the invention may be practiced in still other forms within the scope of the following claims.

I claim:

1. As a composition of matter, the reaction product of (a) a monoacrylated terminated, active hydrogen-containing hydrocarboxy reactant, (b) an aromatic diisocyanate, and (c) a polyacrylated terminated hydrocarboxy reactant, the active hydrogen of reactant (a) reacting with at least one isocyanate radical of reactant (b) to form an isocyanate linkage, the reaction product of reactants (a) and (b) being reacted with reactant (c) in a molar ratio, respectively, of from 1:25 to 25:1, said reactant (c) serving primarily as a cross-linking agent to bond together linear chains formed by the reaction of (a) and (b).

2. The composition of matter of claim 1 in which said monoacrylated hydrocarboxy reactant has an alkyl or alkenyl linear stem and a molecular weight of up to about 8,000.

3. The composition of matter of claim 1 in which said monoacrylated hydrocarboxy reactant has the formula:

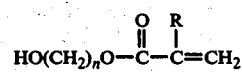

in which R is hydrogen or methyl, and n is a whole number from 1 to 8.

4. The composition of matter of claim 1 in which the aromatic diisocyanate moiety in said first-mentioned reaction product is selected from the group consisting of:

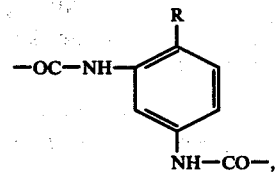

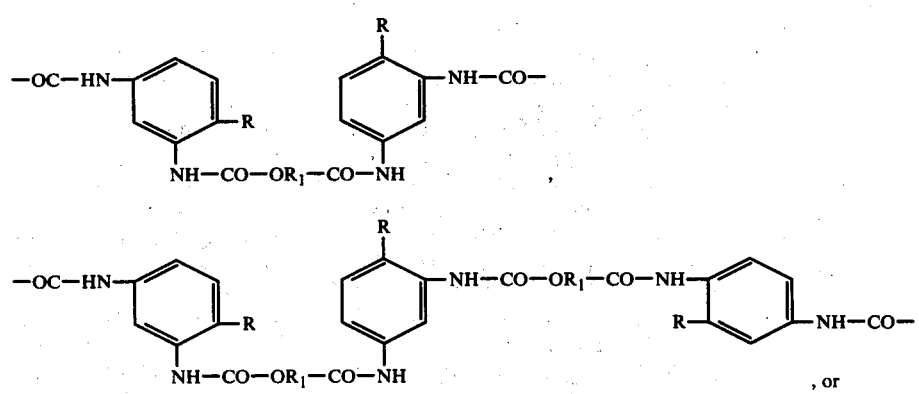

, or

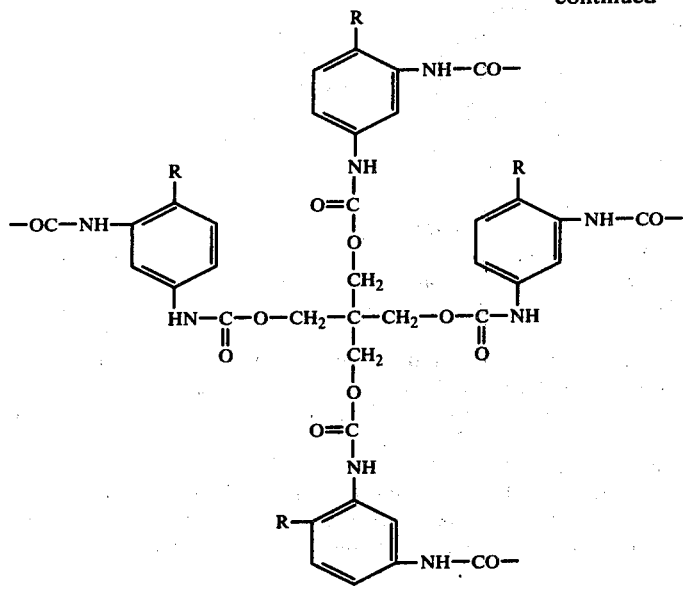

in which R is hydrogen or methyl, $R_1$ is $(C_2H_4O)_n$, and n is a whole number from 1 to 8.

5. The composition of matter of claim 1 in which said polyacrylated terminated, hydrocarboxy reactant is diacrylated and selected from the group consisting of an alkylene glycol diacrylate, alkylene glycol dimethacrylate, a polyalkylene glycol diacrylate, and a polyalkylene glycol dimethacrylate, in which said alkylene group contains 4 to 8 carbon atoms.

6. The composition of matter of claim 1 in which said aromatic diisocyanate in the reaction product formed by reactants (a) and (b) has one isocyanate radical reacted with said active hydrogen of reactant (a) and the other isocyanate radical reacted with a carboxyl radical of an organic acid to form an ester group, said ester group having a molecular weight of about 500 to about 6,000.

7. The composition of matter of claim 6 in which said esterified isocyanate radical has the formula:

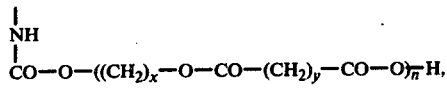

in which x is a whole number from 2 to 4, y is a whole number from 2 to 12, and n is a number sufficient to provide a molecular weight from about 500 to about 6,000 for said esterified isocyanate radical.

8. A gasket comprising a base sheet and a sealant thereon comprising the reaction product of (a) a monoacrylated terminated, active hydrogen-containing hydrocarboxy reactant, (b) an aromatic diisocyanate, and (c) a polyacrylated terminated hydrocarboxy reactant, the active hydrogen of reactant (a) reacting with at least one diisocyanate radical of reactant (b) to form an isocyanate linkage, the reaction product of reactants (a) and (b) being reacted with reactant (c) in a molar ratio, respectively, of from 1:25 to 25:1, said gasket having a compressibility at 1,000 psi of about 2% to about 20%, a film hardness by pencil test of 6B to 4H, an elongation of about 2% to about 100%, and a flexibility by mandrel test of from ⅛ inch to one inch without failure.

9. The gasket of claim 8 in which said first-mentioned reaction product is of (a) a monoacrylated terminated hydrocarboxy reactant having the formula:

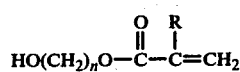

in which R is hydrogen or methyl, and n is a whole number from 1 to 8, (b) an aromatic diisocyanate selected from the group consisting of phenylene diisocyanate and toluylene diisocyanate, and (c) a diacrylated terminated, hydrocarboxy reactant selected from the group consisting of an alkylene glycol diacrylate, an alkylene glycol dimethacrylate, a polyalkylene glycol diacrylate, and a polyalkylene glycol dimethacrylate in which said alkylene group contains from 4 to 8 carbon atoms, the hydrogen of reactant (a) reacting with at least one isocyanate radical of reactant (b) to form an isocyanate linkage, and the reaction product of (a) and (b) being reacted with reactant (c) in a molar ratio, respectively, of 1:25 to 25:1.

10. The composition of matter of claim 9 in which said monoacrylated hydrocarboxy reactant is monoacrylated ethylene glycol, said aromatic diisocyanate is toluylene diisocyanate, and said diacrylated hydrocarboxy reactant is diacrylated tetraethylene glycol.

11. The gasket of claim 8 in which said base sheet is metallic and said first-mentioned reaction product contains from about 1% to about 40% by weight of metallic powder, and said gasket having temperature resistance up to 500° F., a compressibility at 1000 psi. of about 5% to about 20%, a film hardness by pencil test of 6B to 4H, an elongation of about 5% to about 25%, and a flexibility by mandrel test of from ⅛ inch to ¼ inch without failure.

12. A process for preparing an improved gasket comprising placing on sheet material defining a base sheet of said gasket a reaction mixture from a solventless system, said mixture including (a) a monoacrylated terminated, active hydrogen-containing hydrocarboxy reactant, (b) an aromatic diisocyanate, and (c) a polyacrylated terminated, hydrocarboxy reactant, reacting the active hydrogen of reactant (a) with at least one isocyanate radical of reactant (b) to form an isocyanate linkage, and reacting the reaction product of reactants (a) and (b) with reactant (c) in a molar ratio, respectively, of 1:25 to 25:1, said improved gasket having a temperature resistance up to 500° F., a compressibility at 1000 psi. of about 2% to about 20%, a film hardness by pencil test of 6B to 4H, an elongation of about 2% to about 100%, and a flexibility by mandrel test of from ⅛ inch to one inch without failure.

13. The process of claim 12 in which said monoacrylated hydrocarboxy reactant has the formula:

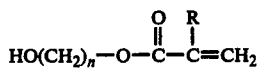

in which R is hydrogen or methyl, and n is a whole number from 1 to 8, said aromatic diisocyanate is selected from the group consisting of phenylene diisocyanate and toluylene diisocyanate, and said polyacrylated hydrocarboxy reactant is diacrylated and selected from the group consisting of an alkylene glycol diacrylate, an alkylene glycol dimethacrylate, a polyalkylene glycol diacrylate, and a polyalkylene glycol dimethacrylate, in which said alkylene group contains 4 to 8 carbon atoms.

14. The process of claim 12 in which said reaction is generated by heat.

15. The process of claim 12 including a peroxide catalyst in said reaction mixture, and catalyzing said reaction by the peroxide catalyst.

16. The process of claim 12 in which said monoacrylated hydrocarboxy reactant has an alkyl or alkenyl linear stem and a molecular weight of up to about 8000.

17. The process of claim 12 in which said monoacrylated hydrocarboxy reactant has the formula:

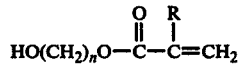

in which R is hydrogen or methyl, and n is a whole number from 1 to 8.

18. The process of claim 12 in which said polacrylated terminated, hydrocarboxy reactant is diacrylated and selected from the group consisting of an alkylene glycol diacrylate, alkylene glycol dimethacrylate, a polyalkylene glycol diacrylate, and a polyalkylene glycol dimethyacrylate, in which said alkylene group contains 4 to 8 carbon atoms.

19. The process of claim 12 in which said aromatic diisocyanate in the reaction product formed by reactants (a) and (b) has one isocyanate radical rected with said active hydrogen of reactant (b) and the other isocyanate radical reacted with a carboxyl radical of an organic acid to form an ester group, said ester group having a molecular weight of about 500 to about 6,000.

* * * * *